:::: {.columns}

(12) United States Patent
Chen

(10) Patent No.: US 10,951,857 B2
(45) Date of Patent: Mar. 16, 2021

(54) METHOD AND SYSTEM FOR VIDEO RECORDING

(71) Applicant: Wangsu Science & Technology Co., Ltd., Shanghai (CN)

(72) Inventor: Yanpeng Chen, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/717,638

(22) Filed: Dec. 17, 2019

(65) Prior Publication Data

US 2020/0382741 A1    Dec. 3, 2020

Related U.S. Application Data

(63) Continuation of application No. PCT/CN2019/090322, filed on Jun. 6, 2019.

(30) Foreign Application Priority Data

Apr. 24, 2019  (CN) .......................... 201910335713.6

(51) Int. Cl.
*H04N 5/92* (2006.01)
*G11B 27/10* (2006.01)
(Continued)

(52) U.S. Cl.
CPC ........... *H04N 5/9202* (2013.01); *G11B 27/10* (2013.01); *G11B 27/36* (2013.01); *H04N 21/2187* (2013.01)

(58) Field of Classification Search
CPC .. H04N 5/9202; H04N 21/2187; G11B 27/10; G11B 27/36
See application file for complete search history.

(56) References Cited

U.S. PATENT DOCUMENTS

2003/0233666 A1  12/2003  Onomatsu et al.
2005/0276282 A1  12/2005  Wells et al.
(Continued)

FOREIGN PATENT DOCUMENTS

CN    101729908 A    6/2010
CN    105357590 A    2/2016
(Continued)

OTHER PUBLICATIONS

Wangsu Science & Technology, European Search Report, EP 19800908.6, dated Apr. 14, 2020, 8 pgs.
(Continued)

*Primary Examiner* — Mishawn N. Hunter
(74) *Attorney, Agent, or Firm* — Morgan, Lewis & Bockius LLP

(57) ABSTRACT

A method and system for video recording are provided, the method including: reading an audio data stream of a target video in real time, and converting a video picture of the target video into a video frame data; monitoring a play state of the target video, recording a start time node when the play state indicates that the live broadcast is paused, and recording an end time node when the play state indicates that the live broadcast is resumed; calculating an amount of a to-be-inserted data based on the start time node and the end time node, and inserting an audio null packet data with an amount equal to the calculated amount before the audio data stream when the live broadcast is resumed; and synthesizing the audio data stream into which the audio null packet data is inserted and the video frame data into a recorded video file.

17 Claims, 3 Drawing Sheets

(51) Int. Cl.
*G11B 27/36* (2006.01)
*H04N 21/2187* (2011.01)

(56) References Cited

U.S. PATENT DOCUMENTS

| | | |
|---|---|---|
| 2007/0223884 A1 | 9/2007 | Lin et al. |
| 2010/0142913 A1 | 6/2010 | Hasegawa |
| 2010/0238792 A1 | 9/2010 | Togo |
| 2013/0251343 A1 | 9/2013 | Lai et al. |

FOREIGN PATENT DOCUMENTS

| | | |
|---|---|---|
| CN | 105657447 A | 6/2016 |
| CN | 105791951 A | 7/2016 |
| CN | 105959773 A | 9/2016 |
| CN | 107018443 A | 8/2017 |
| CN | 107155126 A | 9/2017 |
| CN | 108769786 A | 11/2018 |
| CN | 108830551 A | 11/2018 |
| CN | 109547812 A | 3/2019 |
| CN | 109600564 A | 4/2019 |
| CN | 109600661 A | 4/2019 |
| JP | H 1175157 A | 3/1999 |
| JP | 20070060537 | 8/2007 |

OTHER PUBLICATIONS

Wangsu Science & Technology, First Office Action, CN 201910335713.6, dated Mar. 23, 2020, 8 pgs.
Wangsu Science & Technology Co., Ltd., Office Action, CN201910335713.6, dated Dec. 3, 2020, 4 pgs.

Pause          Resume

Pause          Recording end

METHOD AND SYSTEM FOR VIDEO RECORDING

CROSS-REFERENCE TO RELATED APPLICATIONS

The present application is a continuation of PCT Patent application No. PCT/CN2019/090322 filed on Jun. 6, 2019, entitled "METHOD AND SYSTEM FOR VIDEO RECORDING", which is incorporated herein by reference in its entirety. The above PCT patent application claims priority to Chinese Patent Application No. 201910335713.6, entitled "METHOD AND SYSTEM FOR VIDEO RECORDING," filed on Apr. 24, 2019, which is incorporated herein by reference in its entirety.

TECHNICAL FIELD

The present disclosure relates to Internet technologies, and in particular, to a method and system for video recording.

BACKGROUND

With the continuous development of live video technologies, more and more users tend to watch live videos in a live video platform. A live video is highly time-efficient, and users can also communicate with an anchor or other users in real time by posting a barrage when watching the live video.

Currently, in order to allow users who miss the live broadcast to watch the live video again, an on-going playing device may provide a video recording function. Specifically, for picture content of the live video, the picture content may be intercepted as a video frame in a manner of screenshot. An advantage of such processing is that some visual special effects added to the picture content can be reserved. For example, special effects such as answering questions and giving gifts can be reserved during the live broadcast. For audio content of the live video, an original audio stream of the live video may be read. Subsequently, the intercepted video frame and the read original audio stream are separately encoded to be synthesized into a recorded video file.

However, in the video file recorded as described above, audio may be out of sync with pictures. A reason is that during the live broadcast, it is very likely that the video picture is paused due to a network freeze or the anchor's actively pausing the live broadcast. In this case, the on-going pause scene can be restored in the manner of screenshot. However, when the live broadcast is paused, the audio stream will be interrupted, and consequently a video duration corresponding to the intercepted video frame cannot match a video duration corresponding to the audio stream. For example, it is assumed that the live video lasts for one hour with 10 minutes of it being in a pause state. Then the intercepted video frame can match the duration of one hour, but the obtained audio stream has only a duration of 50 minutes. In this way, when the video frame and the audio stream are synthesized into a video file subsequently, the video picture cannot be in sync with the audio.

It can be seen from the above that method for video recording which is capable of ensuring synchronization of audio and pictures is urgently needed currently.

SUMMARY

The present disclosure is intended to provide a method and system for video recording, to ensure synchronization of audio and pictures in a recorded video file.

In order to achieve the above object, one aspect of the present disclosure provides a method for video recording, the method includes: reading an audio data stream of a target video in real time, and converting a video picture of the target video into a video frame data; monitoring a play state of the target video, recording a start time node at which a live broadcast is paused when the play state of the target video indicates that the live broadcast is paused, and recording an end time node at which the live broadcast is resumed when the play state of the target video indicates that the live broadcast is resumed; calculating an amount of a data to be inserted based on the start time node and the end time node, and inserting an audio null packet data with an amount equal to a calculated amount of the data to be inserted before the audio data stream when the live broadcast is resumed; and synthesizing the audio data stream into which the audio null packet data is inserted and the video frame data into a recorded video file.

In order to achieve the above object, another aspect of the present disclosure provides a system for video recording, the system includes: an audio and video data collection unit, configured to read an audio data stream of a target video in real time and convert a video picture of the target video into a video frame data; a play state monitoring unit, configured to monitor a play state of the target video, record a start time node at which a live broadcast is paused when the play state of the target video indicates that the live broadcast is paused, and record an end time node at which the live broadcast is resumed when the play state of the target video indicates that the live broadcast is resumed; a null packet data insertion unit, configured to calculate an amount of a data to be inserted based on the start time node and the end time node, and insert a audio null packet data with an amount equal to a calculated amount of the data to be inserted before the audio data stream when the live broadcast is resumed; and a recording synthesizing unit, configured to synthesize the audio data stream into which the audio null packet data is inserted and the video frame data into a recorded video file.

It can be seen from the above that, according to the technical solutions provided in the present disclosure, the play state of the target video may be monitored when the audio data stream of the target video is read in real time. The start time node may be recorded when the target video is paused, and the end time node may be recorded when the target video is resumed. In this way, the amount of the audio null packet data that needs to be inserted during the pause may be calculated based on the start time node and the end time node. Corresponding audio null packet data may be inserted before the audio data stream when the target video is resumed. In this way, the audio data stream into which the audio null packet data is inserted may match the video picture of the target video, and the audio data stream may play mute audio null packet data when the target video is paused, thereby ensuring the synchronization of audio and pictures in the recorded video.

BRIEF DESCRIPTION OF THE DRAWINGS

In order to clarify the technical solutions in the embodiments of the present disclosure, the following briefly describes the accompanying drawings required for describing the embodiments. It is evident that the accompanying drawings in the following description show merely some embodiments of the present disclosure, and those of ordinary skill in the art may derive other drawings from these accompanying drawings without creative efforts.

DETAILED DESCRIPTION

In order to clarify the objectives, technical solutions, and advantages of the present disclosure, the following further describes the embodiments of the present disclosure in detail with reference to the accompanying drawings.

The present disclosure provides a method for video recording, and the method may be applied to a device supporting video recording. The device may be an electronic device such as a tablet computer, a smart phone, a desktop computer, a smart wearable device, a notebook computer, or the like used by the user, or may be a service server of a live video platform or a VOD (Video on Demand) platform, and may further be a video recording apparatus used with a display.

Figure 1:
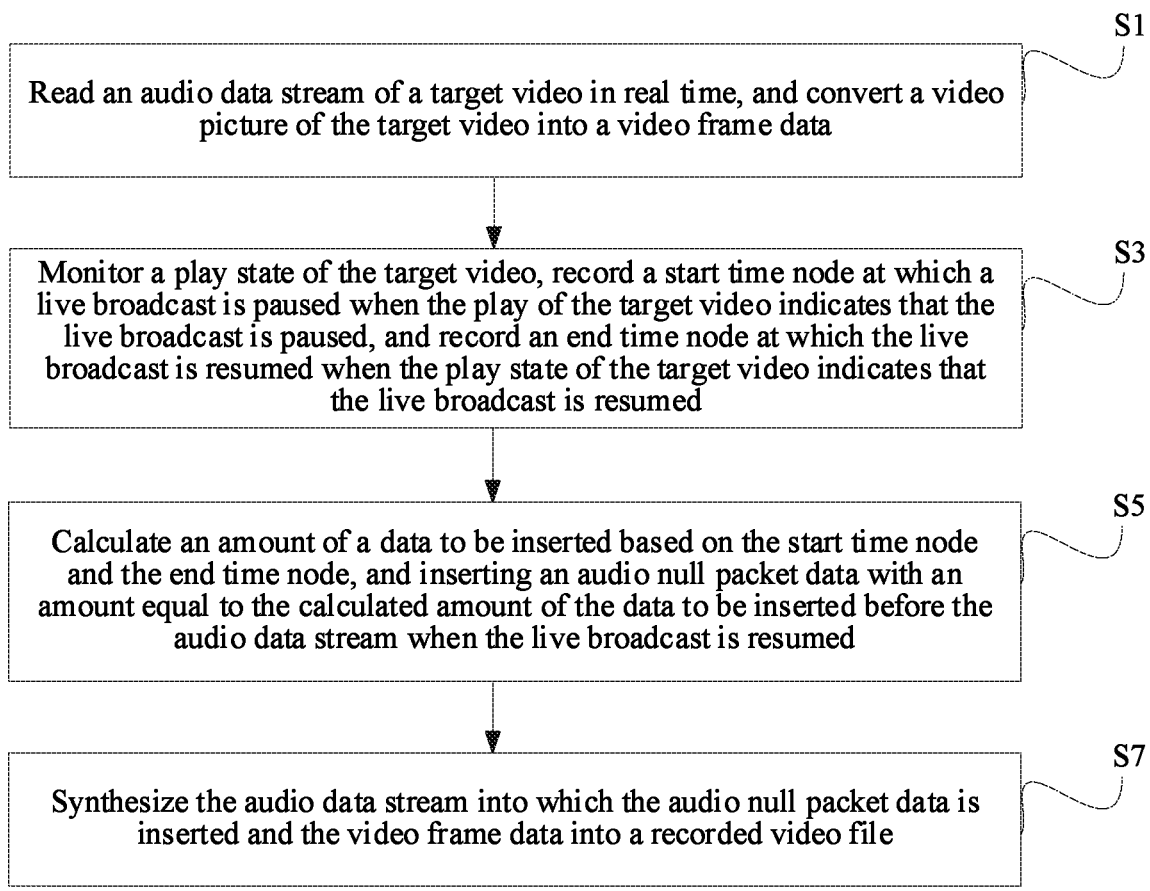
FIG. 1 is a schematic diagram of a method for video recording according to an embodiment of the present disclosure.

Referring to FIG. 1, the method for video recording may include a plurality of steps below.

In step S1, an audio data stream of a target video is read in real time, and a video picture of the target video is converted into a video frame data.

In this embodiment, the target video may include a live video, or may include an on-demand video. An audio collection and a video picture collection may be performed respectively via parallel threads in a video recording device. Specifically, when a player in the video recording device is initialized, or when the video recording device receives an instruction for video recording, an audio collection and coding module and a video collection and coding module may be created. There may be one or more audio collection and coding modules, each audio collection and coding module may correspond to one track in the target video, and usually, there is one video collection and coding module.

In this embodiment, the video recording device may assign an audio parameter of a player playing the target video to the audio collection and coding module after the audio collection and coding module is created, so that the audio collection and coding module reads the audio data stream of the target video in real time according to the assigned audio parameter. The audio parameters may include parameters, for example, such as an audio sampling rate, an audio channel number, an audio sampling bit depth, and the like. In actual application, the audio data stream of the target video may be PCM (Pulse Code Modulation) data, and the PCM data may be obtained via decoding original audio data of the target video. The video recording device may be directly used for playing after receiving the PCM data. Generally, an amount of the PCM data tends to be large. In order to save the capacity of the recorded video file, the audio collection and coding module may encode the PCM data. Specifically, an audio encoder may also be created via the audio collection and coding module after the audio collection and coding module is created. The audio encoder may be configured to encode the read audio data stream of the target video into an audio file of a specified format. The specified format may be specified by a user before the video recording starts, or may be a default format of the video recording device. In actual application, the specified format may be, for example, an mp3 format, or an AAC (Advanced Audio Coding) format, etc. After the audio encoder is created, a corresponding database may be enabled according to an encoding type of the audio encoder. For example, for the encoding type of mp3, a libmp3lame library may be enabled.

In this embodiment, the audio collection and coding module may read the PCM data of the target video, and the audio encoder may encode the read PCM data to generate the audio file of the specified format. In the process of the video recording, the read PCM data and the generated audio file may be stored in a temporary buffer file path. The temporary buffer file path may be generated based on a system time at which the audio collection and coding module is created. In this way, the system time at which the audio collection and coding module is created may uniformly denote the temporary buffer file path for storing the PCM data and the audio file.

In actual application, three management queues may be set after the audio collection and coding module is created, and the three management queues may respectively correspond to recording start and stop operations, PCM data storage, and audio encoding. In this way, different management queues may be correspondingly enabled in different recording stages to ensure that the recording process is performed in sequence.

In an embodiment, since there may be not only one audio collection and coding module, in order to effectively manage a plurality of audio collection and coding modules in sync, the video recording device may further create one audio collection and coding management module in advance. Then, after one or more audio collection and coding modules are created, the created audio collection and coding module may be added to the preset audio collection and coding management module. In this way, the audio collection and coding management module may enable one or more audio collection and coding modules that are currently managed when the video recording starts, and disable one or more audio collection and coding modules and clear a temporary file generated during the video recording after the video recording ends, thereby realizing batch management of the audio collection and coding modules.

In this embodiment, a video collection parameter may be set for the video collection and coding module after the video collection and coding module is created. The video collection parameter may include a plurality of parameters such as a video frame file output path, a video resolution, a video collection frame rate, a video frame pixel format, a video frame encoding mode, and the like. In actual application, the video resolution may be a specified video resolution. If no video resolution is specified, a screen resolution of the video recording device may be directly used as a default video resolution. In addition, the video collection frame rate may be a frame rate range. For example, a typical device usually has a frame rate range of 10 to 30 frames, and the range may also reach between 10 and 60 frames as technology has advanced. If the video collection frame rate input by the user is within the range, the target video may be recorded according to the video collection frame rate input by the user. However, if the video collection frame rate input by the user exceeds the range, an upper limit value or a lower limit value of the range may be taken by default to ensure that the video recording process can be performed normally. The video frame pixel format may be a 32-bit BGRA format.

Definitely, in actual application, other video frame pixel formats may be flexibly selected according to requirements instead of being limited to the 32-bit BGRA format. There may also be a variety of video frame encoding modes. For example, the video frame encoding mode may be an H.264 encoding format, or may be a VP8, VP9 encoding format, and may further be an HEVC encoding format.

It should be noted that a number of required parameters may be changed according to an actual application scenario. For example, during the video recording, the video frame file output path, the video collection frame rate, and the video frame encoding mode are usually necessary, while the video resolution is optional. If no video resolution is specified, it may be considered that the video resolution matches the screen resolution of the video recording device.

In this embodiment, the video picture of the target video may be redrawn into a binary stream via the video collection and coding module according to the video collection parameter, and then the binary stream may further be encoded into a video frame data. The video frame data obtained in this way may retain various visual special effects such as answering questions and giving gifts in the video picture, thereby completely restoring the picture content of the target video. Besides, when the picture of the target video is paused, the paused picture may also be recorded, thereby restoring the real scene of the target video to the full extent during the live broadcast.

In step S3, a play state of the target video is monitored, a start time node at which a live broadcast is paused is recorded when the play state of the target video indicates that the live broadcast is paused, and an end time node at which the live broadcast is resumed is recorded when the play state of the target video indicates that the live broadcast is resumed.

In this embodiment, in the process of reading the audio data stream of the target video in real time, the audio collection and coding module may normally receive the PCM data if the target video is played normally. The audio collection and coding module cannot receive the PCM data if the target video is paused, and then the audio collection and coding module can continue to receive the PCM data after the target video is resumed. In order to ensure that the read audio data stream can be synchronized with the video frame data obtained via conversion by the video collection and coding module, the audio null packet data may be inserted into the audio data stream in allusion to the live broadcast pause process, so that the audio data stream into which the audio null packet data is inserted may be aligned with the video frame data on the time axis.

Specifically, in the recording process of the target video, the play state of the target video may be monitored. In general, the pause state of the target video may include an active pause and a passive pause. The active pause may mean that the target video is actively paused by a video player. At this time, the video player may invoke a pause interface of the player, thereby actively pausing the target video being played. When the pause interface is invoked, the play state parameter indicating that the live broadcast is paused may be transmitted to the audio collection and coding module. In this way, a pause interface may serve as a specified interface for monitoring, and it may be determined whether the target video is paused via monitoring the play state parameter that is transmitted by the specified interface of the player playing the target video. The passive pause may mean that a live broadcast is paused because the player has no data for playing due to network fluctuations or insufficient buffer data. In this case, a play system in which the player is issues a global broadcast notification indicating that the live broadcast is paused. In this way, it may be determined whether the target video is paused via monitoring the global broadcast notification sent by the playback system.

In this way, once the target video is paused, the audio collection and coding module may acquire the state of the pause by the above-mentioned manner. By this time, the audio collection and coding module may record the start time node at which the live broadcast is paused. Subsequently, when the audio collection and coding module may receive the PCM data again, it indicates that the target video is resumed. At the moment, the audio collection and coding module may record the end time node at which the live broadcast is resumed. In this way, a period consisting of the end time node and the start time node may be a period during which the target video is paused.

In step S5, an amount of a data to be inserted is calculated based on the start time node and the end time node, and an audio null packet data with an amount equal to a calculated amount of the data to be inserted is inserted before the audio data stream when the live broadcast is resumed.

In this embodiment, a pause duration may be calculated according to the start time node and the end time node, and then the amount of the data to be inserted may be calculated according to the pause duration and a preset audio parameter. The preset audio parameter may be audio parameters such as an audio sampling rate, an audio sampling bit depth, an audio channel number, and the like that are assigned when the audio collection and coding module is created. In an actual application example, the amount of the data to be inserted may be calculated according to the following formula:

$$D = S \times T \times B/8 \times W$$

Where, D represents the amount of the data to be inserted, S represents the audio sampling rate, T represents the pause duration, B represents the audio sampling bit depth, and W represents the audio channel number.

Figure 2:
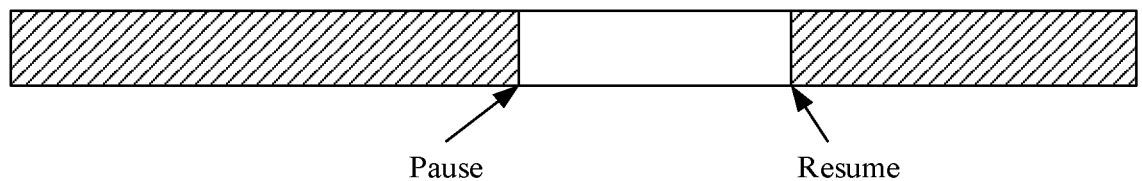
FIG. 2 is a first schematic diagram of insertion of an audio null packet data according to an embodiment of the present disclosure.

Referring to FIG. 2, in this embodiment, after the amount of the data to be inserted is calculated, the audio null packet data with an amount equal to a calculated amount of the data to be inserted may be inserted before the read audio data stream when the live broadcast is resumed. In this way, as shown in FIG. 2, the shadow portion is an actual audio data stream, and the blank portion is the audio null packet data that is inserted when the target video is paused. The audio null packet data may be parsed and played by the play device normally, except that it is mute audio information when played, and the play duration is the same as the pause duration of the live broadcast, so that the audio data stream into which the audio null packet data is inserted may be aligned with the video frame data on the time axis.

In an embodiment, in order to enable the audio collection and coding module to correctly insert the audio null packet data into the read audio data stream, a global variable for indicating whether to insert the audio null packet data may be set in the system in advance. The global variable may have two variable values. When the variable value is a first value, it may indicate that the audio null packet data needs to be inserted currently. When the variable value is a second value, it may indicate that the audio null packet data does not need to be inserted currently. In this way, the variable value of the global variable may be set to the first value when the play state of the target video indicates that the live broadcast is paused. Moreover, each time the audio collection and coding module receives the audio data stream of the target video, an on-going variable value of the global variable may be detected. In this way, the audio collection and coding module may detect the on-going variable value of the global variable when the target video is resumed. Then, because the variable value of the global variable is set to the first value when the live broadcast is paused previously, it may be determined that the audio null packet data needs to be inserted currently when the audio collection and coding module detects that the on-going variable value of the global variable is the first value. Therefore, the amount of the data to be inserted may be calculated based on the start time node and the end time node, and the audio null packet data with an amount equal to the calculated amount of the data to be inserted is inserted before the audio data stream when the live broadcast is resumed. After the audio null packet data is inserted, the audio collection and coding module may set the variable value of the global variable to the second value. In this way, the audio null packet data does not need to be inserted when the audio data stream of the target video is read subsequently, and the variable value of the global variable is set to the first value again until a next live broadcast is paused.

In step S7, the audio data stream into which the audio null packet data is inserted and the video frame data are synthesized into a recorded video file.

In this embodiment, after the audio data stream into which the audio null packet data is inserted and the converted video frame data are obtained, the video recording device may synthesize the audio data stream and the video frame data into a video file, thereby obtaining the recorded video file. Specifically, the video recording device may create a synthesizing management module in advance, and the synthesizing management module may be configured to synthesize the recorded video file.

In an application example, the synthesizing management module may read the video frame data upon having been converted and generate an AVURLAsset object of the video frame data. Then the AVURLAsset object may be added to a video track of an AVMutableComposition object. Next, the synthesizing management module may generate an AVAssetExportSession object by taking the audio data stream into which the video null packet data is inserted and the AVMutableComposition object as initialization parameters. Finally, an AVAssetExportSession export session may be initiated asynchronously to synthesize and export the recorded video file.

It should be noted that if audio data streams of multiple audio tracks are included in the audio recording process, the synthesizing management module may merge these audio data streams to form an audio data stream with a new audio track. Subsequently, the audio data stream with the new audio track and the AVMutableComposition object may be taken as the initialization parameters to generate the AVAssetExportSession object.

In an embodiment, the synthesizing management module may further manage mechanisms in the recording process. These mechanisms may include a timeout mechanism, an end mechanism, and the like. The timeout mechanism may mean that the audio collection and coding module or the video collection and coding module exceeds a preset collection and coding duration. Specifically, an audio collection and coding and a video collection and coding are usually performed successively because the two processes are performed in parallel in different threads. For example, the audio collection and coding may be completed first due to a smaller amount of data that needs to be processed, while the video collection and coding is completed later due to a larger amount of data that needs to be processed. In the process of the collection and coding, sometimes abnormalities may occur in the collection and coding due to some uncontrollable reasons, and these abnormalities increase the duration required for the collection and coding process. In this case, a timeout duration may be set in the synthesizing management module, and after one of the audio collection and coding module and the video collection and coding module completes an audio encoding or a video encoding, an encoding duration of another module is counted. For example, the encoding duration of the video encoding module may be counted after the audio encoding module completes the audio encoding. If the encoding duration reaches the timeout duration, it indicates that an abnormality may occur in the encoding process. At this time, the on-going video recording process may be stopped, and an exception log may be generated. Subsequently, the audio and video collection and coding process may be restarted according to an instruction of the user. Such processing is intended to stop the time-consuming collection and coding process in time and avoid endless waiting.

In this embodiment, the end mechanism may include a normal end, an abnormal end, and cancellation. The normal end may mean that when the video recording ends, the preset duration threshold is not exceeded, and an available capacity of the device is also greater than or equal to a preset capacity threshold. The normal end may further mean that an instruction for ending the recording input by the user is received, when the video recording duration does not exceed the preset duration threshold and the available capacity of the device is also greater than or equal to the preset capacity threshold. In this case, the recorded audio and video data may be processed to be synthesized into a recorded video file when the video recording is finished.

The abnormal end may mean that the recording is forced to end when the duration of the video recording exceeds the above preset duration threshold or the available capacity of the device is less than or equal to the above preset capacity threshold. At this time, the on-going video recording process may be stopped, and the recorded audio data stream and video frame data are synthesized into the recorded video file.

The cancellation may mean that the user actively abandons this recording process. Generally, if a video recording cancel instruction is received in the process of the video recording and the duration of the video recording is less than a minimum recording duration, the on-going video recording process may be stopped, and the recorded audio data stream and video frame data may be emptied. In this case, it may be considered that the instruction for recording the video is an erroneous operation of the user, and if a cancel instruction of the user is received shortly after the instruction for video recording, the on-going video recording process may be abandoned, and the collected data is not processed and directly emptied. However, if a video recording cancel instruction is received in the process of the video recording and the duration of the video recording is greater than or equal to the minimum recording duration, the on-going video recording process may be stopped, but the recorded audio data stream and video frame data need to be synthesized into the recorded video file. The reason for such processing is that the duration of the recording has reached the minimum recording duration, it indicates that the user may just want to record a small portion of the content of the target video. Therefore, in this case, it is necessary to synthesize the collected data into the recorded video file after this recording process is stopped.

Figure 3:
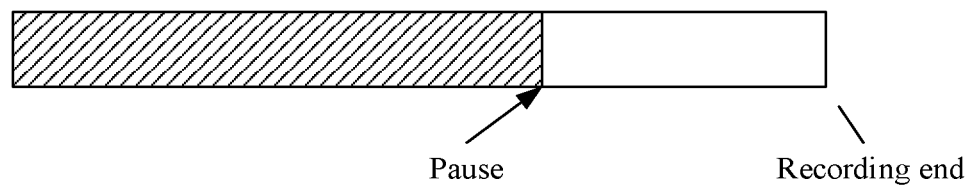
FIG. 3 is a second schematic diagram of insertion of an audio null packet data according to an embodiment of the present disclosure.

In an application scenario, the target video may not be resumed after the target video is paused until the end of the video recording. In this case, the audio null packet data cannot be inserted in the above manner because there is no occasion to resume playing. In view of this, referring to FIG. 3, in an embodiment, if the target video has been in a pause state since the live broadcast is paused until the video recording ends, a time node at which the video recording ends may be recorded, and an amount of a data to be supplemented is calculated according to the time node at which the video recording ends and the start time node at which the live broadcast is paused. At this time, the audio null packet data with an amount equal to the amount of the data to be supplemented may be supplemented after the audio data stream when the live broadcast is paused. In this way, the period after the live broadcast is paused until the video recording ends may be filled with the audio null packet data.

Figure 4:
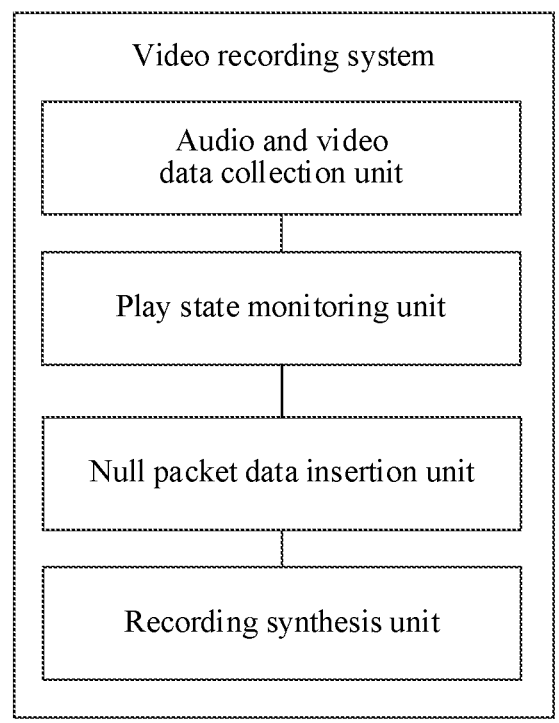
FIG. 4 is a schematic diagram of a function module of a system for video recording according to an embodiment of the present disclosure.

Referring to FIG. 4, the present disclosure further provides a system for video recording, the system includes:

an audio and video data collection unit, configured to read an audio data stream of a target video in real time, and convert a video picture of the target video into a video frame data;

a play state monitoring unit, configured to monitor a play state of the target video, record a start time node at which a live broadcast is paused when the play state of the target video indicates that the live broadcast is paused, and record an end time node at which the live broadcast is resumed when the play state of the target video indicates that the live broadcast is resumed;

a null packet data insertion unit, configured to calculate an amount of a data to be inserted based on the start time node and the end time node, and insert an audio null packet data with an amount equal to a calculated amount of the data to be inserted before the audio data stream when the live broadcast is resumed; and a recording synthesizing unit, configured to synthesize the audio data stream into which the audio null packet data is inserted and the video frame data into a recorded video file.

In an embodiment, the system further includes:

a global variable setting unit, configured to set a variable value of a global variable for indicating whether to insert the audio null packet data to a first value when the play state of the target video indicates that the live broadcast is paused, and detect an on-going variable value of the global variable when the live broadcast is resumed;

where, correspondingly, the null packet data insertion unit is configured to calculate the amount of the data to be inserted based on the start time node and the end time node when the on-going variable value of the global variable is the first value.

In an embodiment, the null packet data insertion unit is further configured to record a time node at which the video recording ends if the target video has been in a pause state since the live broadcast is paused until the video recording ends, calculate an amount of a data to be supplemented according to the time node at which the video recording ends and the start time node at which the live broadcast is paused, and supplement the audio null packet data after the audio data stream when the live broadcast is paused, where the audio null packet data has an amount equal to the amount of the data to be supplemented.

It can be seen from the above that, according to the technical solutions provided in the present disclosure, the play state of the target video may be monitored when the audio data stream of the target video is read in real time. The start time node may be recorded when the target video is paused, and the end time node may be recorded when the target video is resumed. In this way, the amount of the audio null packet data that needs to be inserted in the pause process may be calculated according to the start time node and the end time node. Corresponding audio null packet data may be inserted before the audio data stream when the target video is resumed. In this way, the audio data stream into which the audio null packet data is inserted may match the video picture of the target video, and the audio data stream may play mute audio null packet data when the target video is paused, thereby ensuring the synchronization of audio and pictures in the recorded video.

Based on the above descriptions of the embodiments, those skilled in the art may clearly understand that each embodiment may be implemented by software in addition to a necessary general hardware platform, or certainly may be implemented by hardware. Based on such an understanding, the technical solutions essentially or the part contributing to the existing technologies may be implemented in a form of a software product. The software product is stored in a storage medium, such as a ROM/RAM, a hard disk, or an optical disc, and includes several instructions for instructing a computer device (which may be a personal computer, a server, a network device, or the like) to perform the methods described in the embodiments or some parts of the embodiments.

The above-described are only preferably embodiments of the present disclosure, but are not used to impose a limitation to the present disclosure. Any amendment, equivalent substitution and improvement made within the spirit and principle of the present disclosure shall be included in the protection scope of the present disclosure.

What is claimed is:

1. A method for video recording, comprising:
   at a computer device supporting video recording:
   reading an audio data stream of a target video in real time, and converting a video picture of the target video into video frame data;
   monitoring a play state of the target video, recording a start time node at which a live broadcast is paused when the play state of the target video indicates that the live broadcast is paused, and recording an end time node at which the live broadcast is resumed when the play state of the target video indicates that the live broadcast is resumed;
   calculating an amount of a data to be inserted based on the start time node and the end time node, and inserting audio null packet data with an amount equal to the calculated amount of the data to be inserted before the audio data stream when the live broadcast is resumed; and
   synthesizing the audio data stream into which the audio null packet data is inserted and the video frame data into a recorded video file.

2. The method according to claim 1, wherein the step of monitoring a play state of the target video comprises:
   monitoring a play state parameter transmitted by a specified interface of a player playing the target video; or
   monitoring a global broadcast notification sent by a play system, to determine an on-going play state of the target video via the play state parameter or the global broadcast notification.

3. The method according to claim 1, wherein before the step of calculating an amount of a data to be inserted based on the start time node and the end time node, the method further comprises:

setting a variable value of a global variable to a first value when the play state of the target video indicates that the live broadcast is paused, wherein the variable value of the global variable is configured to indicate whether to insert the audio null packet data, and detecting an on-going variable value of the global variable when the live broadcast is resumed; and correspondingly, calculating the amount of the data to be inserted based on the start time node and the end time node when the on-going variable value of the global variable is the first value, and inserting the audio null packet data with the amount equal to the calculated amount of the data to be inserted before the audio data stream when the live broadcast is resumed.

4. The method according to claim 3, wherein after the step of inserting the audio null packet data with the amount equal to the calculated amount of the data to be inserted, the method further comprises:

setting the variable value of the global variable to a second value, wherein the second value is configured to indicate that there is no need to insert the audio null packet data at present.

5. The method according to claim 1, wherein the step of calculating the amount of the data to be inserted comprises:

calculating a pause duration according to the start time node and the end time node, and calculating the amount of the data to be inserted according to the pause duration and a preset audio parameter; wherein the preset audio parameter comprises an audio sampling rate, an audio sampling bit depth, and an audio channel number.

6. The method according to claim 1, further comprising:

recording a time node at which the video recording ends if the target video has been in a pause state since the live broadcast is paused until the video recording ends, and calculating an amount of a data to be supplemented according to the time node at which the video recording ends and the start time node at which the live broadcast is paused; and supplementing the audio null packet data after the audio data stream when the live broadcast is paused, wherein the audio null packet data has an amount equal to the amount of the data to be supplemented.

7. The method according to claim 1, wherein the step of reading an audio data stream of a target video in real time comprises:

creating an audio collection and coding module, and assigning an audio parameter of a player playing the target video to the audio collection and coding module, so that the audio collection and coding module reads the audio data stream of the target video in real time according to the assigned audio parameter.

8. The method according to claim 7, wherein after the step of creating an audio collection and coding module, the method further comprises:

creating an audio encoder via the audio collection and coding module, wherein the audio encoder is configured to encode the read audio data stream of the target video into an audio file of a specified format.

9. The method according to claim 7, wherein after the step of creating an audio collection and coding module, the method further comprises:

adding a created audio collection and coding module to a preset audio collection and coding management module, wherein the audio collection and coding management module is configured to enable one or more audio collection and coding modules currently managed when the video recording starts, and disable one or more audio collection and coding modules and clear a temporary file generated in the process of the video recording after the video recording ends.

10. The method according to claim 7, wherein the step of converting the video picture of the target video into the video frame data comprises:

creating a video collection and coding module, and setting a video collection parameter for the video collection and coding module, wherein the video collection parameter at least comprises a video frame file output path, a video collection frame rate, and a video frame encoding mode; and redrawing the video picture of the target video into a binary stream via the video collection and coding module according to the video collection parameter, and encoding the binary stream into the video frame data.

11. The method according to claim 10, further comprising:

creating a synthesizing management module, and setting a timeout duration in the synthesizing management module; and after one of the audio collection and coding module and the video collection and coding module completes an audio encoding or a video encoding, counting an encoding duration of another module, and if a counted encoding duration reaches the timeout duration, stopping an on-going video recording process, and generating an exception log.

12. The method according to claim 1, further comprising:

stopping a video recording process, and synthesizing the audio data stream having been recorded and the video frame data into the recorded video file if a duration of the video recording is greater than or equal to a preset duration threshold, or an available capacity of a device is less than or equal to a preset capacity threshold in the process of the video recording.

13. The method according to claim 12, further comprising:

stopping the video recording process, and clearing the audio data stream having been recorded and the video frame data if a video recording cancel instruction is received in the process of the video recording and the duration of the video recording is less than a minimum recording duration; or stopping the video recording process, and synthesizing the audio data stream having been recorded and video frame data into the recorded video file if the video recording cancel instruction is received in the process of the video recording and the duration of the video recording is greater than or equal to the minimum recording duration.

14. The method according to claim 1, further comprising:

stopping a video recording process, and clearing the audio data stream having been recorded and the video frame data if a video recording cancel instruction is received in the process of the video recording and a duration of the video recording is less than a minimum recording duration; or stopping the video recording process, and synthesizing the audio data stream having been recorded and video frame data into the recorded video file if the video recording cancel instruction is received in the process of the video recording and the duration of the video recording is greater than or equal to the minimum recording duration.

15. An apparatus video recording, comprising:
at least one processor; and
memory communicatively coupled to the at least one processor;
wherein the memory stores instructions which, when executed by the at least one processor, cause the at least one processor to:
read an audio data stream of a target video in real time, and convert a video picture of the target video into video frame data;
monitor a play state of the target video, record a start time node at which a live broadcast is paused when the play state of the target video indicates that the live broadcast is paused, and record an end time node at which the live broadcast is resumed when the play state of the target video indicates that the live broadcast is resumed;
calculate an amount of data to be inserted based on the start time node and the end time node, and insert audio null packet data with an amount equal to the calculated amount of the data to be inserted before the audio data stream when the live broadcast is resumed; and
synthesize the audio data stream into which the audio null packet data is inserted and the video frame data into a recorded video file.

16. The apparatus according to claim 15, wherein the instructions further cause the at least one processor to: set a variable value of a global variable to a first value when the play state of the target video indicates that the live broadcast is paused, wherein the variable value of the global variable is configured to indicate whether to insert the audio null packet data, and detect an on-going variable value of the global variable when the live broadcast is resumed; and
calculate the amount of the data to be inserted based on the start time node and the end time node when the on-going variable value of the global variable is the first value.

17. The apparatus according to claim 15, wherein the instructions further cause the at least one processor to: record a time node at which the video recording ends if the target video has been in a pause state since the live broadcast is paused until the video recording ends and calculate an amount of a data to be supplemented according to the time node at which the video recording ends and the start time node at which the live broadcast is paused; and supplement the audio null packet data after the audio data stream when the live broadcast is paused, wherein the audio null packet data has an amount equal to the amount of the data to be supplemented.

* * * * *